(12) United States Patent
Redaelli et al.

(10) Patent No.: US 12,487,921 B1
(45) Date of Patent: Dec. 2, 2025

(54) ENHANCED MEMORY LOG MANAGEMENT

(71) Applicant: Micron Technology, Inc., Boise, ID (US)

(72) Inventors: Marco Redaelli, Munich (DE); Gaurav Sinha, Unterschleißheim (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/776,768

(22) Filed: Jul. 18, 2024

(51) Int. Cl.
*G06F 12/02* (2006.01)
*G06F 3/06* (2006.01)

(52) U.S. Cl.
CPC ........ *G06F 12/0246* (2013.01); *G06F 3/0604* (2013.01); *G06F 3/0656* (2013.01); *G06F 3/0679* (2013.01); *G06F 2212/72* (2013.01)

(58) Field of Classification Search
None
See application file for complete search history.

(56) References Cited

U.S. PATENT DOCUMENTS

| | | | | |
|---|---|---|---|---|
| 2014/0245093 A1* | 8/2014 | Ma | ...................... | G06F 11/1471 714/747 |
| 2018/0032412 A1* | 2/2018 | Zhou | .................. | G06F 11/1474 |
| 2020/0105359 A1* | 4/2020 | Buxton | ............... | G06F 11/3055 |
| 2022/0283734 A1* | 9/2022 | Jang | ...................... | G06F 3/0619 |

* cited by examiner

*Primary Examiner* — Kevin Verbrugge
(74) *Attorney, Agent, or Firm* — Harrity & Harrity, LLP

(57) ABSTRACT

A memory device includes a memory configured with a telemetry namespace, wherein the telemetry namespace is dedicated to storing mapped log parameters of a plurality of log pages, wherein each log page of the plurality of log pages is associated with a respective set of log parameters that, as a whole, provide a full set of log parameters; and a memory controller integrated with the memory and configured to manage operations of the memory. The memory controller is configured to use a bitmap that selectively maps log parameters from the full set of log parameters to the telemetry namespace as the mapped log parameters. The memory controller is configured to monitor the log parameters of the full set of log parameters, and store log information of the mapped log parameters into the telemetry namespace.

24 Claims, 4 Drawing Sheets

ENHANCED MEMORY LOG MANAGEMENT

TECHNICAL FIELD

The present disclosure generally relates to memory devices, memory device operations, and, for example, to enhanced memory log management.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
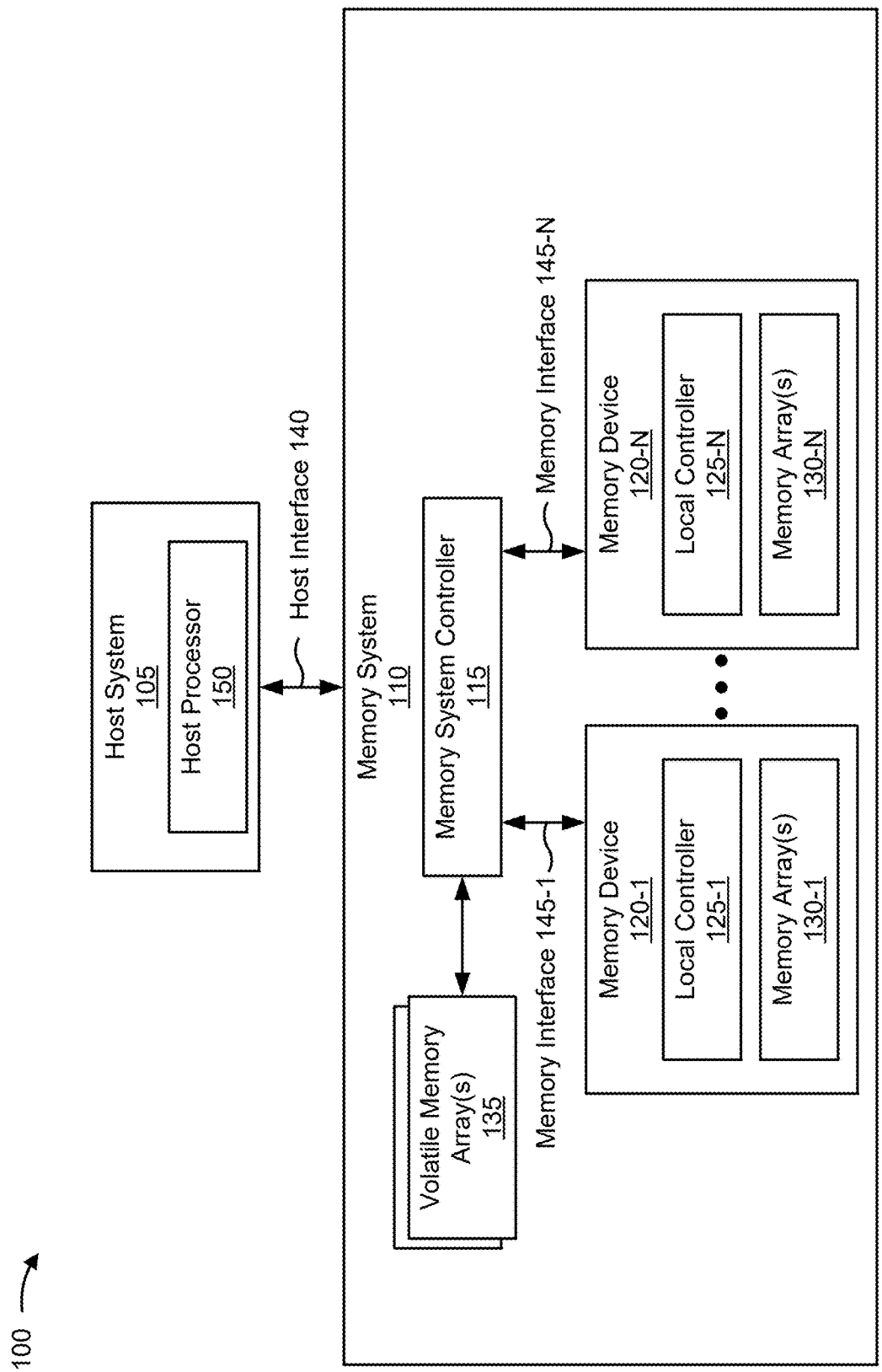
FIG. 1 is a diagram illustrating an example system capable of enhanced memory log management.

Solid-state drives (SSDs) with non-volatile memory express (NVMe) interfaces exploit the speed of a peripheral component interconnect express (PCIe) bus.

Logs are used to monitor, manage, and diagnose the performance and health of NVMe SSDs. These logs provide valuable information about the status of the SSD, errors, performance metrics, and other operational data. Effective management and access of the logs in these SSDs is critical for monitoring device health, optimizing performance, and diagnosing issues. However, due to the sheer volume of data generated by both standard logs and vendor-specific logs, extracting relevant information efficiently poses a technical challenge. Moreover, a conventional approach usually requires a host system to actively participate in logging, which can consume valuable processing resources and possibly lead to bandwidth bottlenecks. For example, in accordance with the NVMe specification, log parameters are not stored within any namespace on the SSD, but are instead passed directly from the SSD to the host system. The host system is then responsible for storing all log parameters in its memory.

In addition, physical distribution of log storage within SSDs, while desirable for organizational and efficiency purposes, has not been adequately addressed in existing systems. Without proper log segregation, the retrieval of pertinent log data can be time-consuming and computationally demanding, requiring more processing power. Current systems also lack a dynamic approach to capturing logs based on specific events or conditions, which restricts proactive monitoring and timely response to potential issues.

Furthermore, the industry lacks a structured, customizable method to define and automatically store logs that are important for individual users or applications. As SSDs evolve in complexity and capacity, addressing these technical problems becomes increasingly critical to improving SSD management and thereby enhancing user experience and system reliability.

Some implementations described herein provide a memory device with improved log management via a dedicated telemetry namespace. A namespace is a logical division of a memory that can be independently managed and accessed. Each namespace acts like a separate storage volume (e.g., a separate physical partition) with its own file system and can be formatted independently of other namespaces on a same memory device.

Several log pages are defined for memory device monitoring. The memory device may be a managed NAND (mNAND) device, such as an SSD (e.g., an NVMe SSD), an embedded multimedia card (eMMC), or a universal flash (UF) storage device. An mNAND device is a memory device in which a memory controller is integrated with a memory for managing operations of the memory. Thus, the memory controller is coupled with the memory via one or more interfaces carrying out one or more operations with the memory.

Each log page may be identified by a specific log page identifier (LID). These log pages can be queried to retrieve various types of information from an SSD (e.g., from an NVMe drive). Each log page may be associated with a respective set of log parameters that, as a whole, provide a full set of log parameters. In other words, the set of log parameters from each log page may, cumulatively, add up to the full set of log parameters. An Error Information Log may be one type of log page, which may contain detailed information (e.g., error log parameters) about errors that have occurred in the SSD. A self-monitoring, analysis, and reporting technology (SMART)/health information log may be another type of log page. The SMART/health information log may provide data on the health and reliability of the SSD, including metrics like temperature, available spare capacity, percentage used, and media errors. Thus, the SMART/health information log may be a type of health information log page that may include health log parameters, error log parameters, performance log parameters, and/or operational log parameters. Log parameters may be provided in one log page or distributed across multiple log pages.

A memory controller may be integrated with the memory, and may be configured to use a bitmap to selectively map log parameters from a full set of log parameters to the telemetry namespace as mapped log parameters. The memory controller may identify mapped log parameters from a full set of log parameters based on a bitmap. The memory controller may manage operations of the memory, such as read and write operations, and may monitor the log parameters of the log pages. Additionally, the memory controller may automatically store log information of the mapped log parameters in the telemetry namespace. Thus, the telemetry namespace may be configured as a memory partition that is dedicated to storing only the mapped log parameters identified by the bitmap. As a result, the mapped log parameters are a subset of log parameters that may be formed from log parameters selected from a same log page or from different log pages on a user-defined basis and/or an application-defined basis. Storing the mapped log parameters in the telemetry namespace may reduce clutter, improve organization of pertinent log parameters, facilitate a retrieval of pertinent log data, and/or reduce processing power required for log parsing and retrieval.

In some aspects, the telemetry namespace is configured as a circular memory buffer, enhancing the logging system's efficiency. The memory controller can also send notifications to a host device when specific trigger events, such as an approaching end of the telemetry namespace buffer, occur. The memory controller may capture log information automatically based on predefined intervals, in response to trigger events, or based on specific commands received from the host device.

In this way, technical challenges associated with the management of voluminous log data in SSDs may be addressed by the memory controller. This structured approach to log storage and retrieval using the telemetry namespace may enable precise and scalable monitoring of SSD health, which can conserve processing and memory resources due to reduced overhead in log parsing. System reliability may be enhanced through this streamlined logging system that allows for timely detection and responses to potential SSD issues, which, in turn, may conserve network resources by mitigating unnecessary data retrieval and transmission.

Furthermore, automation of the log storage of mapped log parameters into the telemetry namespace not only conserves host device resources by minimizing host involvement in log management, but may also improve the quality and reliability of the memory device.

FIG. 1 is a diagram illustrating an example system 100 capable of enhanced memory log management. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, an SSD, a flash memory system (e.g., a NAND flash memory system or a NOR flash memory system), a universal serial bus (USB) drive, a memory card (e.g., a secure digital (SD) card), a secondary storage device, an NVMe device, an eMMC device, a UF storage device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller. Thus, the memory system 110 or the memory device 120 may be a managed NAND (mNAND) device.

The system controller 115 may receive a bitmap from the host processor 150 used for log management and log parsing. The system controller 115 may send one or more instructions to the local controller 125 based on the bitmap.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). A memory array 130 may be configured as a namespace (e.g., a memory partition). For example, each memory array 130 may be configured as a single namespace. In some implementations, a memory array 130 may be configured as multiple namespaces (e.g., multiple memory partitions). Thus, a memory array may include multiple memory partitions. The memory system 110 may include a memory device 120 with a telemetry namespace that is dedicated to storing mapped log parameters of a plurality of log pages. Each log page of the plurality of log pages may be associated with a respective set of log parameters that, as a whole, provide a full set of log parameters that are monitored by the memory system controller 115 and/or the local controller 125. For example, the memory system controller 115 may be configured to use the bitmap, which selectively maps log parameters from the full set of log parameters to the telemetry namespace as the mapped log parameters. The memory system controller 115 and/or the local controller 125 may identify mapped log parameters from a full set of log parameters based on a bitmap. Thus, the memory system controller 115 and/or the local controller 125 may monitor the log parameters of the full set of log parameters, and store log information of the mapped log parameters into the telemetry namespace. In particular, the memory system controller 115 and/or the local controller 125 may evaluate the log parameters of the full set of log parameters, and store the log information of the mapped log parameters into the telemetry namespace. Log information may include parameter values associated with respective log parameters.

The bitmap may indicate which log parameters from the full set of log parameters are the mapped log parameters. For example, the bitmap may include a binary value for each log parameter of the full set of log parameters, and each binary value may indicate whether or not a corresponding log parameter of the full set of log parameters is mapped to the telemetry namespace. In addition, log parameters from the full set of log parameters that are not mapped to the telemetry namespace are not stored in the telemetry namespace. Instead, log parameters from the full set of log parameters that are not mapped to the telemetry namespace may be passed on to the host system 105. In other words, the full set of log parameters may be stored in a different namespace outside of the telemetry namespace, for example, in a namespace of the host system 105.

In some implementations, the telemetry namespace may be configured as a circular memory buffer. The memory system controller 115 and/or the local controller 125 may monitor a write location within the telemetry namespace, and indicate a warning based on the write location being within a predetermined number of buffer slots of an end buffer slot of the telemetry namespace. For example, the memory system controller 115 may provide the warning to the host processor 150, and the host processor 150 may indicate the warning to a user. Additionally, or alternatively, the memory system controller 115 and/or the local controller 125 may monitor a write location within the telemetry namespace, and indicate a warning based on a next log dump expected to cause a start buffer slot of the telemetry namespace to be overwritten. The memory system controller 115 may provide the warning to the host processor 150, and the host processor 150 may indicate the warning to a user.

The memory system controller 115 and/or the local controller 125 may monitor each log parameter of the full set of log parameters, and store the log information of a respective mapped log parameter in the telemetry namespace in response to capturing the log information of the respective mapped log parameter. Additionally, or alternatively, memory system controller 115 and/or the local controller 125 may capture log information for each mapped log parameter at respective predetermined intervals, and automatically store the log information of a respective mapped log parameter in the telemetry namespace in response to capturing the log information of the respective mapped log parameter. Additionally, or alternatively, the memory system controller 115 and/or the local controller 125 may receive a capture command from the host processor 150, capture log information for at least one of the mapped log parameters in response to the capture command, and automatically store the log information of a respective mapped log parameter in the telemetry namespace in response to capturing the log information of the respective mapped log parameter.

In addition, the memory system controller 115 and/or the local controller 125 may monitor for a trigger event, capture log information for at least one of the mapped log parameters in response to an occurrence of the trigger event, and automatically store the log information of a respective mapped log parameter in the telemetry namespace in response to capturing the log information of the respective mapped log parameter. A trigger event may be a predefined condition that is monitored for by the memory system controller 115 and/or the local controller 125. When the predefined condition is satisfied, the memory system controller 115 and/or the local controller 125 may initiate a capture of at least one of the mapped log parameters corresponding to the predefined condition. Different predefined conditions may be associated with different sets of log parameters, including different sets of mapped log parameters. Additionally, or alternatively, a predefined condition may be associated with all mapped log parameters. Thus, a trigger event may trigger some or all mapped log parameters to be captured. The host processor 150 may provide the memory system controller 115 with instructions as to how to monitor the mapped log parameters, including frequency (e.g., at which predetermined interval each mapped log parameter is to be captured), and which mapped log parameter is associated with each type of trigger event. In addition, the memory system controller 115 may notify the host processor 150 of a trigger event in response to the occurrence of the trigger event. Thus, the host processor 150 may notify a user of the occurrence of the trigger event so that the user may take further action, if desired.

In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120.

In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a PCIe interface, an NVMe interface, a USB interface, a Universal Flash Storage (UFS) interface, an eMMC interface, a double data rate (DDR) interface, and/or a DIMM interface.

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

Although the example memory system 110 described above includes a memory system controller 115, in some implementations, the memory system 110 does not include a memory system controller 115. For example, one or more local controllers 125 included in one or more corresponding memory devices 120 may perform the operations described herein as being performed by the memory system controller 115. Furthermore, as used herein, a "controller" may refer to the memory system controller 115 and/or a local controller 125. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may include a memory configured with a telemetry namespace, wherein the telemetry namespace is dedicated to storing mapped log parameters of a plurality of log pages, wherein each log page of the plurality of log pages is associated with a respective set of log parameters that, as a whole, provide a full set of log parameters; and a memory controller integrated with the memory and configured to manage operations of the memory, wherein the memory controller is configured to use a bitmap that selectively maps log parameters from the full set of log parameters to the telemetry namespace as the mapped log parameters, and wherein the memory controller is configured to monitor the log parameters of the full set of log parameters, and store log information of the mapped log parameters into the telemetry namespace.

In some implementations, one or more systems, devices, apparatuses, components, and/or controllers of FIG. 1 may include a host device comprising a host controller; a memory device comprising a memory and a memory controller; and a peripheral component interconnect (PCI) communication interface configured to communicatively couple the host device and the memory device, wherein the memory is configured with a telemetry namespace, wherein the telemetry namespace is dedicated to storing mapped log parameters of a plurality of log pages, wherein each log page of the plurality of log pages is associated with a respective set of log parameters that, as a whole, provide a full set of log parameters, wherein the memory controller is configured to receive a bitmap from the host device, wherein the bitmap selectively maps log parameters from the full set of log parameters to the telemetry namespace as the mapped log parameters, and wherein the memory controller is configured to evaluate the log parameters of the full set of log parameters, and store log information of the mapped log parameters into the telemetry namespace.

In some implementations, one or more systems, devices, apparatuses, components, and/or controllers of FIG. 1 may be configured to configure a memory controller with a bitmap that selectively maps log parameters, from a full set of log parameters, as mapped log parameters to a telemetry namespace of a managed memory, wherein the telemetry namespace is dedicated to storing the mapped log parameters; periodically evaluate the mapped log parameters to capture log information of the mapped log parameters; and automatically store the log information of the mapped log parameters in the telemetry namespace in response to capturing the log information, wherein the bitmap includes a binary value for each log parameter of the full set of log parameters, and wherein each binary value indicates whether or not a corresponding log parameter of the full set of log parameters is mapped to the telemetry namespace.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
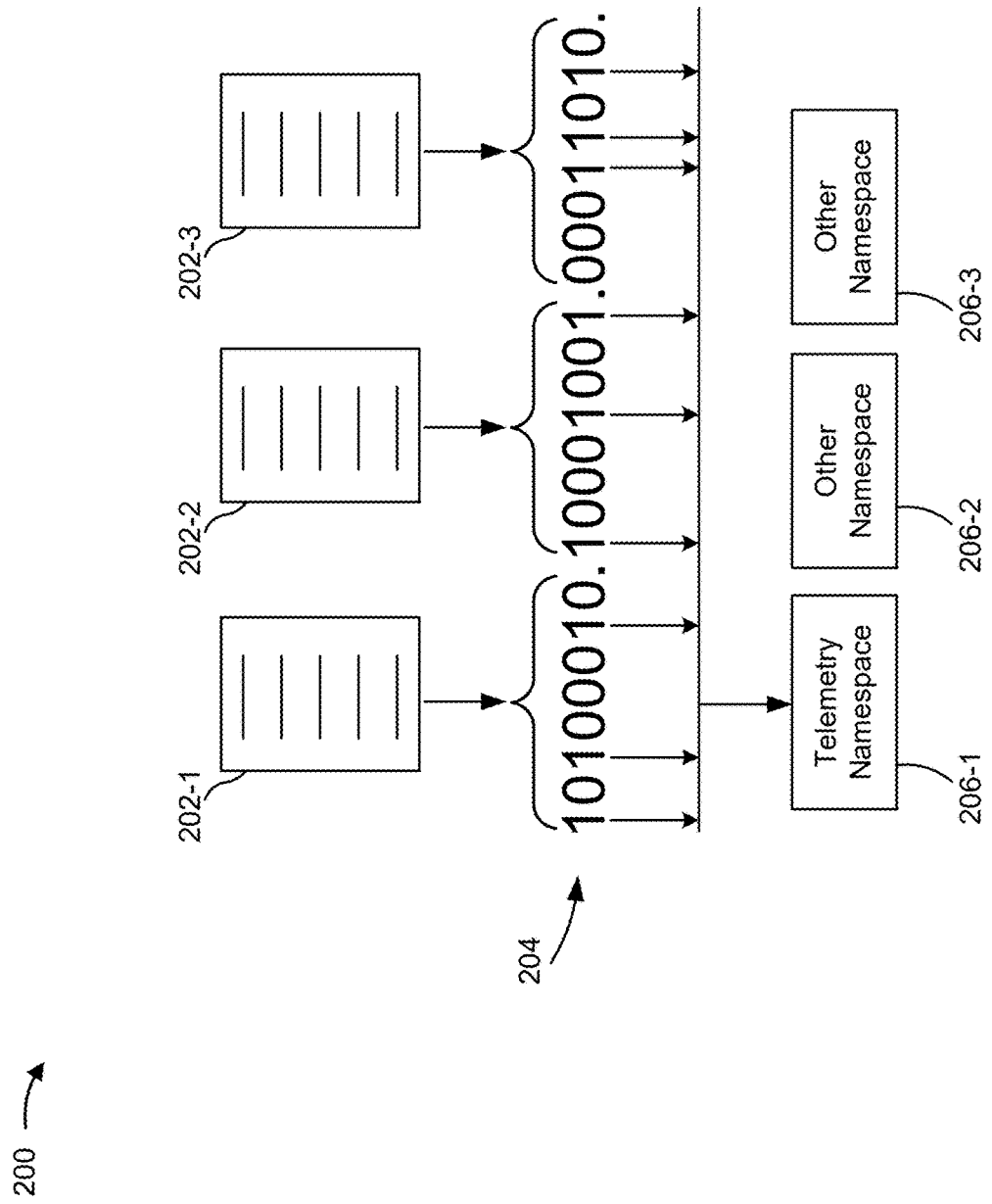
FIG. 2 is a diagram of a log management scheme according to one or more implementations.

FIG. 2 is a diagram of a log management scheme 200 according to one or more implementations. The log management scheme 200 includes multiple log pages 202 (e.g., log pages 202-1, 202-2, and 202-3), with each log page 202 being associated with a respective set of log parameters that, as a whole, provide a full set of log parameters. The log management scheme 200 includes a bitmap 204, with different bitmap sections corresponding to different log pages 202. In addition, the log management scheme 200 may include multiple namespaces 206 (e.g., namespaces 206-1, 206-2, and 206-3). Namespace 206-1 may be a telemetry namespace that is dedicated to storing mapped log parameters that are selected from the log parameters of the log pages 202-1, 202-2, and 202-3. In addition, the telemetry namespace 206-1 may be a circular memory buffer. Thus, data stored in the telemetry namespace 206-1 may be overwritten when the telemetry namespace 206-1 is filled.

The bitmap 204 may include a binary value for each log parameter of the full set of log parameters (e.g., for each log parameter included in the log pages 202). Each binary value may indicate whether or not a corresponding log parameter of the full set of log parameters is mapped to the telemetry namespace 206-1. For example, a "1" may indicate that a particular log parameter is mapped to the telemetry namespace 206-1, whereas a "0" may indicate that a particular log parameter is not mapped to the telemetry namespace 206-1. Thus, the bitmap 204 indicates which log parameters from the full set of log parameters are the mapped log parameters to be stored in the telemetry namespace 206-1. The bitmap 204 may include one or more boundaries (e.g. ".") that separate different log pages within the bitmap 204. A memory controller may identify mapped log parameters from a full set of log parameters based on a bitmap.

When a mapped log parameter is captured by a memory controller, the memory controller may store the log information of the mapped log parameter in the telemetry namespace 206-1 for easy reference and retrieval. One or more of the other namespaces (e.g., namespace 206-2 and/or namespace 206-3) may be configured to store other data.

The number and arrangement of components shown in FIG. 2 are provided as an example. In practice, there may be additional components, fewer components, different components, or differently arranged components than those shown in FIG. 2.

Figure 3:
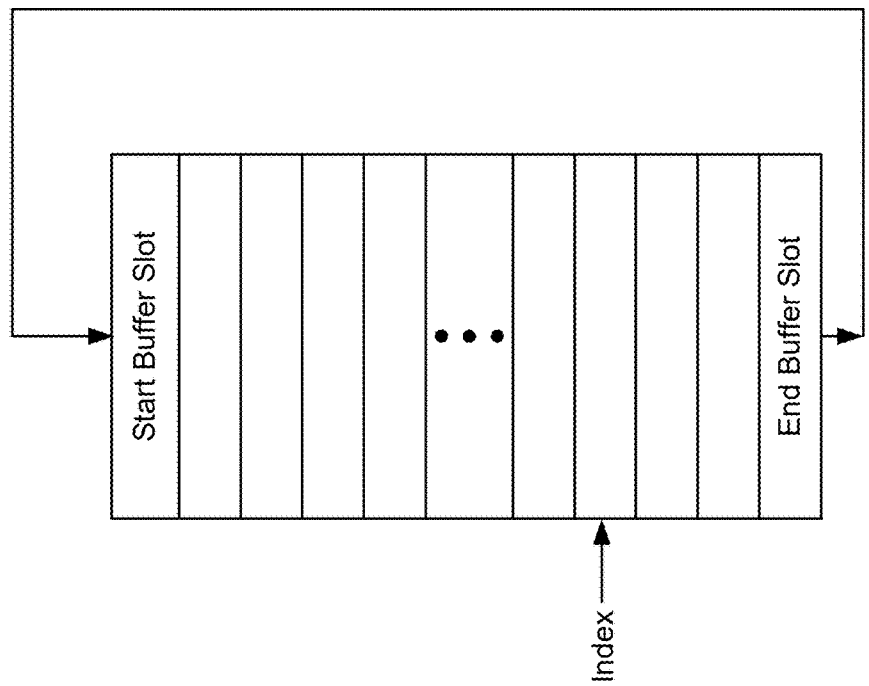
FIG. 3 is a diagram of a telemetry namespace according to one or more implementations.

FIG. 3 is a diagram of a telemetry namespace 300 according to one or more implementations. The telemetry namespace 300 may be dedicated to storing mapped log parameters according to a bitmap, as similarly described above in connection with FIGS. 1 and 2. The telemetry namespace 300 may be a circular memory buffer that includes a start buffer slot, an end buffer slot, and a plurality of buffer slots between the start buffer slot and the end buffer slot. The buffer slots may be written to in a sequential order, starting with the start buffer slot. An index may be used to indicate a current write location within the telemetry namespace 300. After the end buffer slot is written to, the index returns to the start buffer slot. Thus, any data stored in the start buffer slot will be overwritten when the index returns to the start buffer slot and the start buffer slot is written to. A memory controller (e.g., the memory system controller 115 and/or a local controller 125) may monitor a write location (e.g., the index) within the telemetry namespace 300, and indicate a warning based on the write location being within a predetermined number of buffer slots of the end buffer slot. The memory controller may provide the warning to a host device (e.g., host processor 150). The host device may notify a user of the warning so that the user may take further action, if desired. For example, the warning may provide the user with an opportunity to retrieve log information from the telemetry namespace 300 prior to the index returning to the start buffer slot, before the log information is overwritten by further log parameter captures. In some implementations, the memory controller may monitor the write location within the telemetry namespace 300, and indicate a warning based on a next log dump expected to cause the start buffer slot of the telemetry namespace 300 to be overwritten. For example, some or all mapped log parameters may be captured in a batch, referred to as a log dump. Thus, the memory controller may anticipate, based on the current location of the index, whether or not the start buffer slot will be overwritten at the next log dump. In some implementations, the warning may indicate that a certain threshold percentage of the telemetry namespace 300 is filled (e.g., 90% filled) based on the location of the index. Accordingly, the warning ensures that pertinent log information can be retrieved at the host device prior to being overwritten.

As indicated above, FIG. 3 is provided as an example. Other examples may differ from what is described with regard to FIG. 3.

Figure 4:
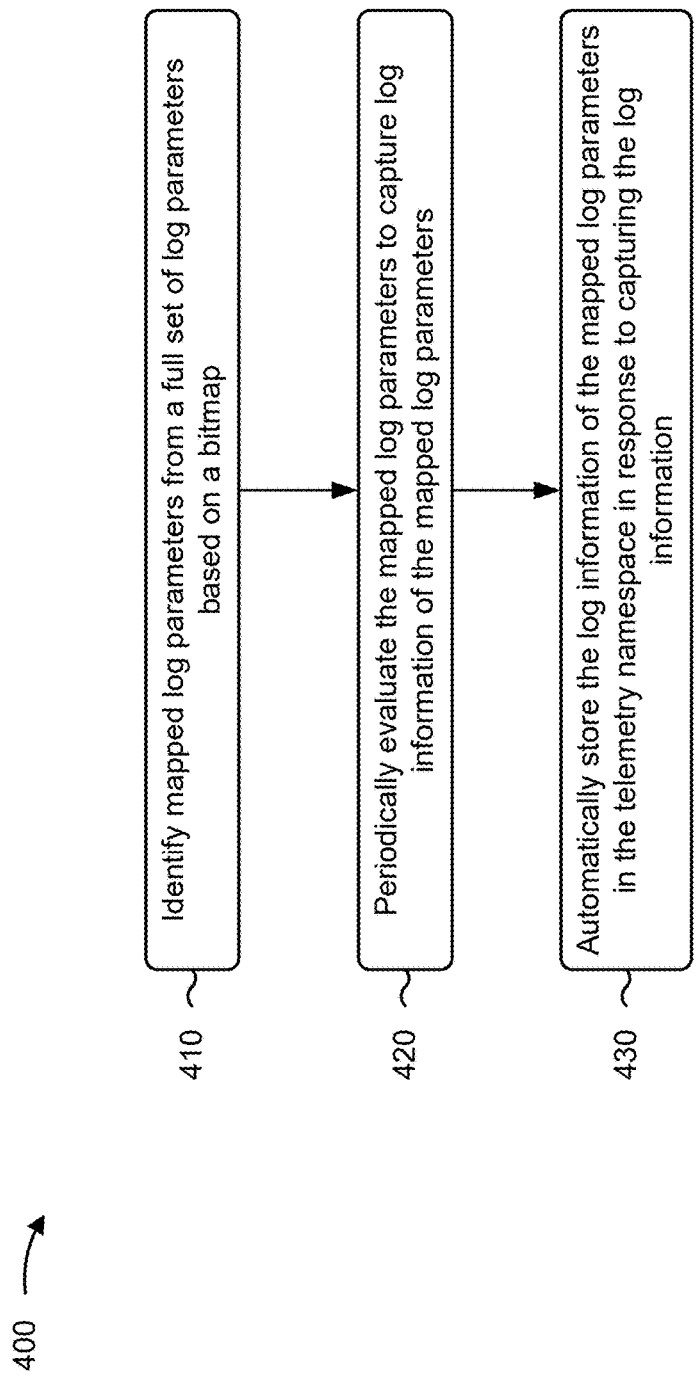
FIG. 4 is a flowchart of an example method associated with enhanced memory log management.

FIG. 4 is a flowchart of an example method 400 associated with enhanced memory log management. In some implementations, a memory system (e.g., the system 100) may perform or may be configured to perform the method 400. Additionally, or alternatively, one or more components of the memory system (e.g., host system 105, memory system 110, memory system controller 115, and/or local controller 125) may perform or may be configured to perform the method 400. Thus, means for performing the method 400 may include the memory system and/or one or more components of the memory system. Additionally, or alternatively, a non-transitory computer-readable medium may store one or more instructions that, when executed by the memory system, cause the memory system to perform the method 400.

As shown in FIG. 4, the method 400 may include identifying mapped log parameters from a full set of log parameters based on a bitmap, wherein the bitmap selectively maps log parameters, from the full set of log parameters, as the mapped log parameters to a telemetry namespace of a managed memory (block 410). The telemetry namespace may be dedicated to storing the mapped log parameters. As further shown in FIG. 4, the method 400 may include periodically evaluating the mapped log parameters to capture log information of the mapped log parameters (block 420). As further shown in FIG. 4, the method 400 may include automatically storing the log information of the mapped log parameters in the telemetry namespace in response to capturing the log information (block 430). The bitmap may include a binary value for each log parameter of the full set of log parameters. In addition, each binary value may indicate whether or not a corresponding log parameter of the full set of log parameters is mapped to the telemetry namespace.

The method 400 may include additional aspects, such as any single aspect or any combination of aspects described below and/or described in connection with one or more other methods or operations described elsewhere herein.

In a first aspect, the bitmap may indicate which log parameters from the full set of log parameters are the mapped log parameters.

In a second aspect, alone or in combination with the first aspect, the bitmap includes a binary value for each log parameter of the full set of log parameters, and wherein each binary value indicates whether or not a corresponding log parameter of the full set of log parameters is mapped to the telemetry namespace.

In a third aspect, alone or in combination with one or more of the first and second aspects, logging parameters from the full set of log parameters that are not mapped to the telemetry namespace are not stored in the telemetry namespace.

In a fourth aspect, alone or in combination with one or more of the first through third aspects, logging parameters from the full set of log parameters that are not mapped to the telemetry namespace are stored only in respective log pages in one or more namespaces outside of the telemetry namespace.

In a fifth aspect, alone or in combination with one or more of the first through fourth aspects, the plurality of log pages include at least one of a SMART log page, a health information log page, or an error log page.

In a sixth aspect, alone or in combination with one or more of the first through fifth aspects, the memory device is an NVMe SSD, an eMMC, or a UF storage device.

In a seventh aspect, alone or in combination with one or more of the first through sixth aspects, the memory device is an mNAND device.

In an eighth aspect, alone or in combination with one or more of the first through seventh aspects, the telemetry namespace is configured as a circular memory buffer.

In a ninth aspect, alone or in combination with one or more of the first through eighth aspects, the method may include monitoring, by a memory controller, a write location within the telemetry namespace, and indicating, by the memory controller, a warning based on the write location being within a predetermined number of buffer slots of an end buffer slot of the telemetry namespace.

In a tenth aspect, alone or in combination with one or more of the first through ninth aspects, the method may include monitoring, by the memory controller, a write location within the telemetry namespace, and indicating, by the memory controller, a warning based on a next log dump expected to cause a start buffer slot of the telemetry namespace to be overwritten.

In an eleventh aspect, alone or in combination with one or more of the first through tenth aspects, the method may include monitoring, by the memory controller, each log parameter of the full set of log parameters, and storing, by the memory controller, the log information of a respective mapped log parameter in the telemetry namespace in response to capturing the log information of the respective mapped log parameter.

In a twelfth aspect, alone or in combination with one or more of the first through eleventh aspects, the method may include capturing, by the memory controller, log information for each mapped log parameter at respective predetermined intervals, and automatically storing, by the memory controller, the log information of a respective mapped log parameter in the telemetry namespace in response to capturing the log information of the respective mapped log parameter.

In a thirteenth aspect, alone or in combination with one or more of the first through twelfth aspects, the method may include receiving, by the memory controller, a capture command from a host device, capturing, by the memory controller, log information for at least one of the mapped log parameters in response to the capture command, and automatically storing, by the memory controller, the log information of a respective mapped log parameter in the telemetry namespace in response to capturing the log information of the respective mapped log parameter.

In a fourteenth aspect, alone or in combination with one or more of the first through thirteenth aspects, the method may include monitoring, by the memory controller, for a trigger event, capturing, by the memory controller, log information for at least one of the mapped log parameters in response to an occurrence of the trigger event, and automatically storing, by the memory controller, the log information of a respective mapped log parameter in the telemetry namespace in response to capturing the log information of the respective mapped log parameter.

In a fifteenth aspect, alone or in combination with one or more of the first through fourteenth aspects, the method may include notifying, by the memory controller, a host device of the trigger event in response to the occurrence of the trigger event.

In a sixteenth aspect, alone or in combination with one or more of the first through fifteenth aspects, the method may include sending, by a host controller, a read command to the memory controller, and wherein the memory controller is configured to, based on receiving the read command, send the log information of the mapped log parameters stored in the telemetry namespace to the host controller.

In a seventeenth aspect, alone or in combination with one or more of the first through sixteenth aspects, the memory includes one or more further namespaces.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein.

Some implementations include a memory device, comprising: a memory configured with a telemetry namespace, wherein the telemetry namespace is dedicated to storing mapped log parameters of a plurality of log pages, wherein each log page of the plurality of log pages is associated with a respective set of log parameters that, as a whole, provide a full set of log parameters; and a memory controller integrated with the memory and configured to manage operations of the memory, wherein the memory controller is configured to use a bitmap that selectively maps log parameters from the full set of log parameters to the telemetry namespace as the mapped log parameters, and wherein the memory controller is configured to monitor the log parameters of the full set of log parameters, and store log information of the mapped log parameters into the telemetry namespace.

Some implementations include a system, comprising: a host device comprising a host controller; a memory device comprising a memory and a memory controller; and a peripheral component interconnect (PCI) communication interface configured to communicatively couple the host device and the memory device, wherein the memory is configured with a telemetry namespace, wherein the telemetry namespace is dedicated to storing mapped log parameters of a plurality of log pages, wherein each log page of the plurality of log pages is associated with a respective set of log parameters that, as a whole, provide a full set of log parameters, wherein the memory controller is configured to receive a bitmap from the host device, wherein the bitmap selectively maps log parameters from the full set of log parameters to the telemetry namespace as the mapped log parameters, and wherein the memory controller is configured to evaluate the log parameters of the full set of log parameters, and store log information of the mapped log parameters into the telemetry namespace.

In some implementations, a method of managing a storage of log parameters includes identifying, by a memory controller, mapped log parameters from a full set of log parameters based on a bitmap, wherein the bitmap selectively maps log parameters, from the full set of log parameters, as the mapped log parameters to a telemetry namespace of a managed memory, wherein the telemetry namespace is dedicated to storing the mapped log parameters; periodically evaluating, by the memory controller, the mapped log parameters to capture log information of the mapped log parameters; and automatically storing, by the memory controller, the log information of the mapped log parameters in the telemetry namespace in response to capturing the log information, wherein the bitmap includes a binary value for each log parameter of the full set of log parameters, and wherein each binary value indicates whether or not a corresponding log parameter of the full set of log parameters is mapped to the telemetry namespace.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising;
   a memory configured with a telemetry namespace, wherein the telemetry namespace is dedicated to storing mapped log parameters of a plurality of log pages, wherein each log page of the plurality of log pages is associated with a respective set of log parameters from a full set of log parameters; and
   a memory controller integrated with the memory and configured to manage operations of the memory,
   wherein the memory controller is configured to use a bitmap that selectively maps log parameters from the full set of log parameters to the telemetry namespace as the mapped log parameters, and
   wherein the memory controller is configured to monitor the log parameters of the full set of log parameters, and store log information of the mapped log parameters into the telemetry namespace.

2. The memory device of claim 1, wherein the bitmap indicates which log parameters from the full set of log parameters are the mapped log parameters.

3. The memory device of claim 1, wherein the bitmap includes a binary value for each log parameter of the full set of log parameters, and
   wherein each binary value indicates whether or not a corresponding log parameter of the full set of log parameters is mapped to the telemetry namespace.

4. The memory device of claim 1, wherein log parameters from the full set of log parameters that are not mapped to the telemetry namespace are not stored in the telemetry namespace.

5. The memory device of claim 1, wherein log parameters from the full set of log parameters that are not mapped to the telemetry namespace are provided to a host system.

6. The memory device of claim 1, wherein the plurality of log pages include at least one of a self-monitoring, analysis, and reporting technology (SMART) log page, a health information log page, or an error log page.

7. The memory device of claim 1, wherein the memory device is a non-volatile memory express (NVMe) solid-state drive (SSD), an embedded multimedia card (eMMC), or a universal flash (UF) storage device.

8. The memory device of claim 1, wherein the memory device is a managed NAND (mNAND) device.

9. The memory device of claim 1, wherein the telemetry namespace is configured as a circular memory buffer.

10. The memory device of claim 9, wherein the memory controller is configured to monitor a write location within the telemetry namespace, and indicate a warning based on the write location being within a predetermined number of buffer slots of an end buffer slot of the telemetry namespace.

11. The memory device of claim 9, wherein the memory controller is configured to monitor a write location within the telemetry namespace, and indicate a warning based on a next log dump expected to cause a start buffer slot of the telemetry namespace to be overwritten.

12. The memory device of claim 1, wherein the memory controller is configured to monitor each log parameter of the full set of log parameters, and store the log information of a respective mapped log parameter in the telemetry namespace in response to capturing the log information of the respective mapped log parameter.

13. The memory device of claim 1, wherein the memory controller is configured to capture log information for each mapped log parameter at respective predetermined intervals, and automatically store the log information of a respective mapped log parameter in the telemetry namespace in response to capturing the log information of the respective mapped log parameter.

14. The memory device of claim 1, wherein the memory controller is configured to receive a capture command from a host device, capture log information for at least one of the mapped log parameters in response to the capture command, and automatically store the log information of a respective mapped log parameter in the telemetry namespace in response to capturing the log information of the respective mapped log parameter.

15. The memory device of claim 1, wherein the memory controller is configured to monitor for a trigger event, capture log information for at least one of the mapped log parameters in response to an occurrence of the trigger event, and automatically store the log information of a respective mapped log parameter in the telemetry namespace in response to capturing the log information of the respective mapped log parameter.

16. The memory device of claim 15, wherein the memory controller is configured to notify a host device of the trigger event in response to the occurrence of the trigger event.

17. A system, comprising;
a host device comprising a host controller;
a memory device comprising a memory and a memory controller; and
a peripheral component interconnect (PCI) communication interface configured to communicatively couple the host device and the memory device,
wherein the memory is configured with a telemetry namespace, wherein the telemetry namespace is dedicated to storing mapped log parameters of a plurality of log pages, wherein each log page of the plurality of log pages is associated with a respective set of log parameters that, as a whole, provide a full set of log parameters,
wherein the memory controller is configured to receive a bitmap from the host device,
wherein the bitmap selectively maps log parameters from the full set of log parameters to the telemetry namespace as the mapped log parameters, and
wherein the memory controller is configured to evaluate the log parameters of the full set of log parameters, and store log information of the mapped log parameters into the telemetry namespace.

18. The system of claim 17, wherein the host controller is configured to send a read command to the memory controller, and
wherein the memory controller is configured to, based on receiving the read command, send the log information of the mapped log parameters stored in the telemetry namespace to the host controller.

19. The system of claim 17, wherein the bitmap includes a binary value for each log parameter of the full set of log parameters, and
wherein each binary value indicates whether or not a corresponding log parameter of the full set of log parameters is mapped to the telemetry namespace.

20. The system of claim 17, wherein the memory controller is configured to capture log information for each mapped log parameter at respective predetermined intervals, and automatically store the log information of a respective mapped log parameter in the telemetry namespace in response to capturing the log information of the respective mapped log parameter.

21. The system of claim 17, wherein the memory controller is configured to receive a capture command from the host controller, capture log information for at least one of the mapped log parameters in response to the capture command, and automatically store the log information of a respective mapped log parameter in the telemetry namespace in response to capturing the log information of the respective mapped log parameter.

22. The system of claim 17, wherein the memory controller is configured to monitor for a trigger event, capture log information for at least one of the mapped log parameters in response to an occurrence of the trigger event, automatically store the log information of a respective mapped log parameter in the telemetry namespace in response to capturing the log information of the respective mapped log parameter, and notify the host controller of the trigger event in response to the occurrence of the trigger event.

23. A method of managing a storage of log parameters, the method comprising:
identifying, by a memory controller, mapped log parameters from a full set of log parameters based on a bitmap, wherein the bitmap selectively maps log parameters, from the full set of log parameters, as the mapped log parameters to a telemetry namespace of a managed memory, wherein the telemetry namespace is dedicated to storing the mapped log parameters;

periodically evaluating, by the memory controller, the mapped log parameters to capture log information of the mapped log parameters; and automatically storing, by the memory controller, the log information of the mapped log parameters in the telemetry namespace in response to capturing the log information, wherein the bitmap includes a binary value for each log parameter of the full set of log parameters, and wherein each binary value indicates whether or not a corresponding log parameter of the full set of log parameters is mapped to the telemetry namespace.

24. The method of claim 23, wherein the bitmap indicates which log parameters from the full set of log parameters are the mapped log parameters.

* * * * *